Jan. 1, 1952 S. O. MORRISON 2,581,125
FILTER AND TEMPERATURE CONTROL
Filed Feb. 27, 1946 5 Sheets-Sheet 1

Inventor
Samuel O. Morrison
by
Attorneys

Jan. 1, 1952  S. O. MORRISON  2,581,125
FILTER AND TEMPERATURE CONTROL
Filed Feb. 27, 1946  5 Sheets-Sheet 2

Inventor
Samuel O. Morrison
by
Attorneys.

Jan. 1, 1952  S. O. MORRISON  2,581,125
FILTER AND TEMPERATURE CONTROL
Filed Feb. 27, 1946  5 Sheets-Sheet 3

Inventor
Samuel O. Morrison
by
Attorneys

Jan. 1, 1952     S. O. MORRISON     2,581,125
FILTER AND TEMPERATURE CONTROL
Filed Feb. 27, 1946     5 Sheets-Sheet 4

Inventor
Samuel O. Morrison
Attorneys

Patented Jan. 1, 1952

2,581,125

UNITED STATES PATENT OFFICE 2,581,125

FILTER AND TEMPERATURE CONTROL

Samuel O. Morrison, Pine Ridge, Media, Pa., assignor to Sunroc Refrigeration Company, Dover, Del., a corporation of Delaware Application February 27, 1946, Serial No. 650,437

12 Claims. (Cl. 62—141)

My invention relates to water filters, especially in connection with drinking water coolers, and to processes relating thereto.

A purpose of my invention is to inhibit contamination of drinking water filters by the growth of organisms in such filters, especially bacteria or fungi.

A further purpose is to reduce the corrosion of water filters especially of the type employing activated carbon as a filter medium and having metallic parts, due to electrolytic corrosion caused by the junction potential between the filter and the metallic parts.

A further purpose is to maintain a drinking water filter continuously at a controlled low temperature by automatic refrigeration.

A further purpose is to employ a tube-in-tube heat transfer device in heat transfer relation with a drinking water filter, desirably bonding a few but not necessarily all of the turns of the tube-in-tube construction to the water filter.

A further purpose is to place the inner refrigerant tube of a tube-in-tube heat transfer mechanism in direct heat transfer contact with a portion of a water filter.

A further purpose is to employ tube-in-tube construction in connection with a storage tank filter with which an expansion valve or a capillary metering device may be used. I prefer to use the latter because of its flexibility.

Figures 1, 2, 3, 4, 5:
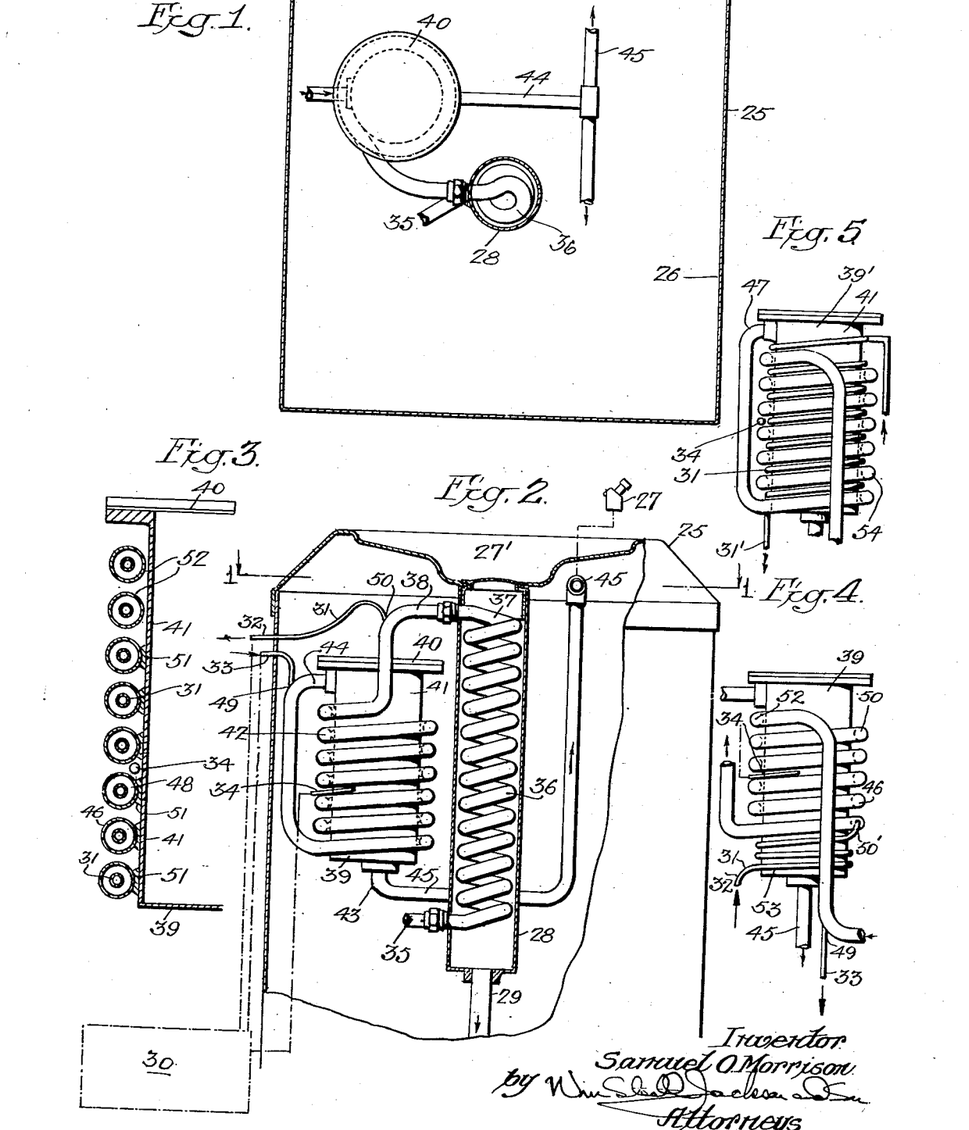
Figure 1 is a horizontal section of the preferred embodiment of the invention, the section being taken on the line 1—1 of Figure 2.
Figure 2 is a front elevation of Figure 1, partly in central vertical section.
Figure 3 is a fragmentary enlarged central vertical section showing a tube-in-tube heat transfer construction applied to the water filter of Figures 1 and 2.
Figure 4 is a front elevation of a modified tube-in-tube construction and water filter of the character shown in Figures 1 to 3.
Figure 5 is a further modification generally corresponding to Figure 4.

For rigid temperature control I take one or more turns of the expanded gas tubing around the filter tank in bonded contact prior to inserting the water jacket of tube-in-tube construction. This is shown in Figure 4. A thermostat-controlled bulb may be located at any of various positions, the location being selected in order to secure the best efficiency.

A further purpose is to surround a water filter by separate refrigerant and water coils in heat transfer contact with the water filter.

A further purpose is to pass water in a water cooler through both a water filter under automatic refrigeration and a heat transfer vessel under automatic refrigeration.

A further purpose is to pass the cold waste water from a drinking water cooler through a pre-cooler for incoming drinking water, taking incoming drinking water from the pre-cooler into a refrigerated water filter.

A further purpose is to employ a refrigerated heat transfer vessel for drinking water and to place a water filter in such vessel, there subjecting it to the refrigeration of the vessel or to separate refrigeration.

A further purpose is to employ a hollow wall type heat transfer mechanism in a water cooler and to place a water filter in heat transfer contact with one side of the wall and a storage chamber in heat transfer contact with the other side thereof.

In the drawings I have chosen to illustrate several of the possible embodiments of the invention, choosing the particular forms shown from the standpoints of convenience in illustration, satisfactory operation and clear demonstration of the principles involved.

Describing in illustration, but not in limitation and referring to the drawings.

In the prior art there has been considerable effort to improve the potability of domestic drinking water, particularly in respect to the features which may reduce the pleasure of the user, whether or not they necessarily affect the health, such as removal of taste, color, turbidity, gross inclusions of foreign matter and color. For such purposes numerous attempts have been made to apply drinking water filters, especially of the activated carbon type, in connection with drinking water installations in homes, hotels, offices and industrial establishments.

Great difficulty has been encountered due to the fact that the filter tends to become itself a source of infection, due to the fact that organisms, such as bacteria and fungi, which are normally collected from the drinking water by the action of the filter, have tended to develop and grow in the filter, thus making the filter in many instances a positive source of danger. Due to this feature, the life of the filter medium has, in many instances, been so short as to be uneconomical, and when the filter medium has been allowed to remain in operation long enough to be economical a source of potential danger of contamination of the drinking water has existed.

This is further complicated by the fact that it is necessary for commercial reasons to make the structural parts, and especially the casing of the filter out of metal, and where normal engineering metals have been used, the filter medium, especially activated carbon, has shown a very pronounced junction potential with the metal, thus causing pronounced corrosion of the metal greatly aggravated by the electrolytic effect and further contaminating the filter with corrosion products, which has reduced the efficiency of the filter and interfered with convenient change of the filter medium.

As a result of study of this problem, I have discovered that the above difficulties can be greatly reduced by maintaining the filter continuously at a predetermined low temperature under automatic refrigeration.

In respect to the organisms, such as bacteria and fungi, the automatic refrigeration has the effect of inhibiting growth of such organisms, which are inevitably collected in the filter. In some cases the low temperature may result in the destruction of the organisms, where in other cases it will merely retard or prevent their reproduction, but in any case the low temperature will inhibit the development of the organisms and tend to prevent the filter from becoming a source of infection or greatly prolong the time before this condition can occur.

It will be evident that the choice of the temperature at which the filter will be set will vary with local conditions, it being preferable to use a lower temperature where there is any possible doubt in regard to the domestic water supply. Temperatures almost as low as the freezing point of water may be used, but it will be understood that I prefer to use a temperature of between 36 and 42° F.

I find that the use of the low temperature also greatly reduces the corrosion due to electrolytic junction potential between the metal parts and the filter medium especially activated carbon, since the effectiveness of the water filter as an electric "battery" is markedly reduced by the low temperature. Thus the difficulty through electrolytic corrosion is minimized by maintaining the device at a low temperature.

It will be understood that this invention may be used in connection with the invention of Orville C. Morrison, embodied in U. S. application, Serial No. 643,974, filed January 29, 1946, for Water Filter and Process, which reduces electrolytic corrosion in a water filter by applying noble metal, especially silver, on the interior thereof. When used in connection with this invention, the low temperature gives a further protection against possible corrosion.

It is important that the water filter not merely be subjected temporarily to the refrigeration, but be continuously maintained at the predetermined low temperature, since if the water filter is allowed to rise to an elevated temperature at frequent intervals and subjected to only occasional refrigeration, dangerous contamination by organisms and serious corrosion may develop. It is preferable once the filter is installed, to maintain it at the predetermined refrigeration temperature at all times, except when the filter is opened to wash it and change the filter medium.

In the form of Figures 1 to 3, I illustrate a water cooler 25 (sometimes called a drinking fountain), having a housing 26 of steel sheet or the like, provided with a suitable water discharge from a bubbler, fountain or spigot 27 above the water cooler (indicated diagrammatically in Figure 2), which drains through a sloping drainage recess 27' into a drainage sump 28 to a drain pipe 29.

The water cooler is refrigerated by a suitable automatic refrigerating unit 30 (shown diagrammatically in Figure 2), which may be of the compression-expansion type, absorption type or any other suitable character, not itself forming part of the present invention.

The automatic refrigeration unit 30 delivers refrigeration medium (such as compressed gas of the character of Freon or the like), through a suitable refrigeration coil 31 partially shown diagrammatically in Figure 2, the outlet to the refrigeration coil being at 32 and the inlet at 33. The automatic refrigeration unit 30 is automatically controlled by a thermostatic element 34 suitably connected to the automatic refrigeration unit in any manner well known in the art.

The inlet from the domestic water system desirably enters the water cooler through an inlet pipe 35, and is preferably passed first through a pre-cooler in heat transfer relation with the cold drain water. In Figures 1 and 2 the pre-cooler consists of a coil 36, preferably of metal having high conductivity, such as copper, and contained within the sump 28.

A water filter 39, preferably of internal construction later to be described, is located adjacent the pre-cooler, as shown. The top 40 is made removable, as later explained, to permit change of the filter medium. The wall or casing 41 of the filter is desirably made of any of the commercial structural metals or alloys, such as iron, steel, copper, brass or aluminum, preferably lined as later explained. For the present application it is preferable, however, to make the casing of a metal of high conductivity such as copper for heat transfer purposes as will be explained.

Immediately surrounding and in heat transfer relation with the water filter is a heat transfer mechanism, here shown as a tube-in-tube coil 42, having an inlet from the pre-cooler at 38 and an outlet 44 extending to the water filter inlet. The outlet of the water filter to the bubbler is through a pipe 45.

The heat transfer mechanism 42 desirably consists of an inner pipe 31, which is filled with the refrigeration medium previously described, and suitably extends through the center of the tube-in-tube construction, as shown in Figure 3, and an outer pipe 46, which forms the outer wall of the heat transfer mechanism and is desirably also formed of copper or other material having high conductivity. Between the inlet 38 of the heat transfer mechanism and the outlet 44, water is conducted through the space 48 between the inner and outer pipes or tubes of the tube-in-tube heat transfer mechanism. The refrigerant tube 31 is led into the heat transfer mechanism through a welded joint at 49 and is led out through a welded joint at 50.

The outer pipe 46 of each turn of the tube-in-tube construction is bonded preferably by brazing, welding or soldering at 51 to the casing 41 of the water filter. The bonds 51 may apply to all turns or to all except the first few at 52 on the inlet side with respect to the water flow, which are unbonded, as shown in Figure 3. This has the advantage of preventing too ready transfer of heat from the tube-in-tube construction to the water filter casing at these first few turns where the water has not had an opportunity to become well cooled, since it has just been brought in contact with refrigerant, whereas at other points where the water is thoroughly cooled, there is intimate contact with the casing 41 due to the heat transfer bonds 51.

In some instances, it is desirable to obtain even more effective cooling of the filter than that provided in the form of Figures 1, 2 and 3.

Where, for example, a tube-in-tube construction is used in connection with a capillary metering device, it is advisable to use the first turn or turns of the active refrigerating tube in bonded contact with the filter tank wall.

This is not only good practice but in some cases, where the temperature of the refrigerant is extremely low, it avoids freezing the water at the point at which the refrigerant tube is introduced within the water tube. It also helps to maintain a low, even temperature within the filter itself.

Figure 4 shows a tube-in-tube construction in which the lead-in point 50' of the refrigerant tube 31 into the water tube 46 has been provided at a point part way along a filter. The early turns 53 of the refrigerant coil 31 are brought directly in contact with the water filter, preferably being welded or brazed to the water filter casing, as shown at the bottom of the filter (Figure 4).

The upper part of the filter in Figure 4 is cooled by heat transfer from the refrigerant through the cooled water and through the walls of the pipe 46. In Figure 4 a few of the turns are preferably unbonded at 52.

It will not in all cases be necessary to use the tube-in-tube construction just described.

Figure 5 illustrates a water filter 39' surrounded by a water cooling coil 54, which is in heat transfer relation to the casing 41 of the water filter, and preferably bonded to it, a refrigerant coil 31 being inter-wound with the coil 54, also in heat transfer relation with the casing, and preferably bonded to it. The bonding may be by welding or brazing. Thus in this form cooling from the refrigerant cools the water in the coil 54 which is flowing towards the filter and will enter the filter at 47 and also directly cools the filter and maintains the desired low temperature in the water filter.

It will be noted that in the forms of Figures 1 to 5, inclusive, the water filter itself acts as a reservoir for cold water, maintaining a substantial supply of refrigerated water at all times. In some cases it will be necessary to have a wholly separate reservoir.

It will also be noted that in the forms of Figures 1 to 5 the water is thoroughly refrigerated in the heat transfer mechanism before it enters the water filter. This need not always be the case.

Figure 6:
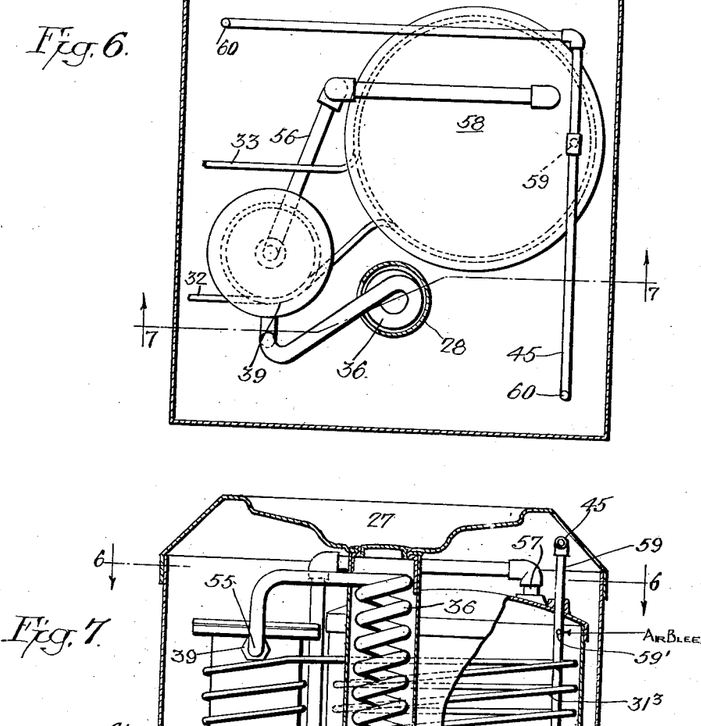
Figure 6 is a section of a modified water cooler design, the section being taken on the line 6—6 of Figure 7.
Figure 7:
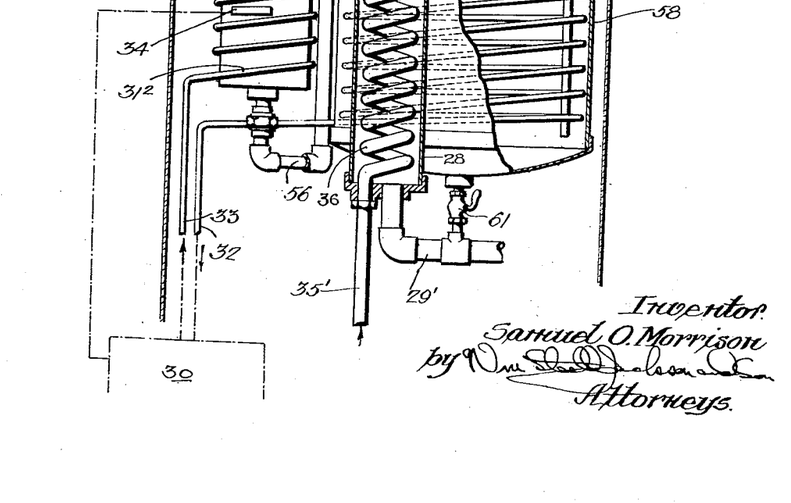
Figure 7 is a partially broken section on the line 7—7 in Figure 6.

In Figures 6 and 7 the pre-cooler receives water from the inlet 35' near the bottom of the pre-cooling coil 35, and passes water, after pre-cooling, through the connection 55 to the inlet of the water filter 39. The water filter is surrounded by a refrigerant coil $31^2$ having an inlet at 33. The coil $31^2$ is desirably of copper or the like and is welded, brazed or otherwise bonded in a heat transfer relation with the casing 41 of the water filter. The temperature control of the automatic refrigeration is provided by the element 34 in contact with the water filter. From the water filter, the outlet water passes through a pipe 56 to the inlet 57 of a suitable heat transfer reservoir 58, which has a discharge at 59 to the pipe 45 connecting with the bubblers at 60. The refrigerant coil $31^2$ passes from the water filter to the heat transfer reservoir 58, where a separate refrigerant coil $31^3$ receives the refrigerant medium, which has just passed around the water filter. From the coil $31^3$ the refrigerant returns to the automatic refrigerator through the connection 32.

For convenience in cleaning the heat transfer reservoir 58, the drain connection 29' carries also a valved connection 61 from the heat transfer reservoir into the drain.

It will be necessary that the water flow in Figures 6 and 7 be first through the pre-cooler, then through the water filter, where cooling action of the refrigerant is first applied, and then through the heat transfer reservoir where water cooling can, if desired, be carried further and the water will be maintained at the desired low temperature.

In some cases where a heat transfer reservoir separate from the filter is to be employed, it will be preferable to place the water filter physically in such a reservoir.

Figure 8:
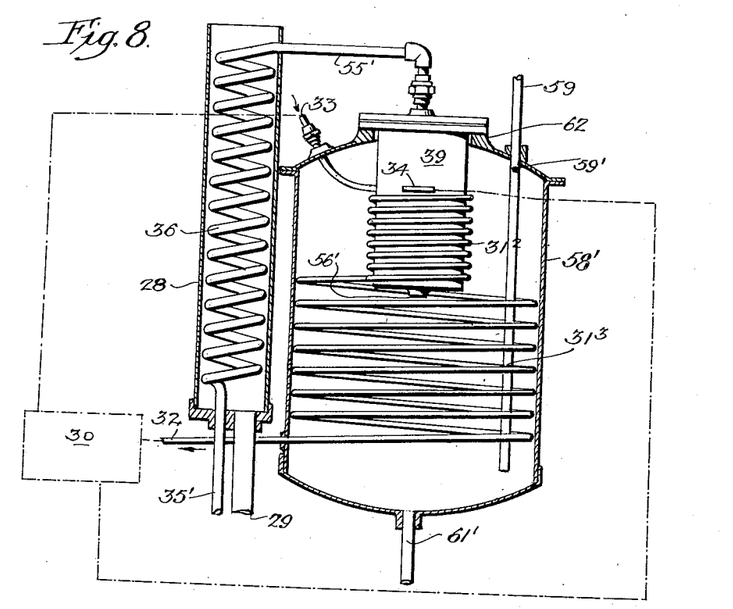
Figure 8 is a central vertical section of a further modification in the water cooler construction.

In the form of Figure 8 the heat transfer reservoir 58' has the water filter 39 placed in the top at 62. Water enters the pre-cooler and then passes out of the pre-cooler through the connection 55' to the inlet of the water filter 39. The refrigerant coil $31^2$ surrounds the water filter as in Figures 6 and 7, and receives refrigerant from an automatic refrigerator 30 through inlet 33, control being from the thermostatic element 34 in contact with the casing of the water filter.

From the water filter, filtered water is discharged at 56' directly into water storage reservoir and heat transfer mechanism 58', where it is subjected to further cooling and maintained at low temperature by the refrigerant coil $31^3$ in extension of the coil $31^2$. Water leaves the system for the bubbler or other discharge through the connection 59, see also bleeder 59', here and in Figure 12 to prevent the tank from becoming air bound, and a suitable valve-controlled drain for the reservoir as provided at 61' (valve not shown but see Figure 7).

Figure 9:
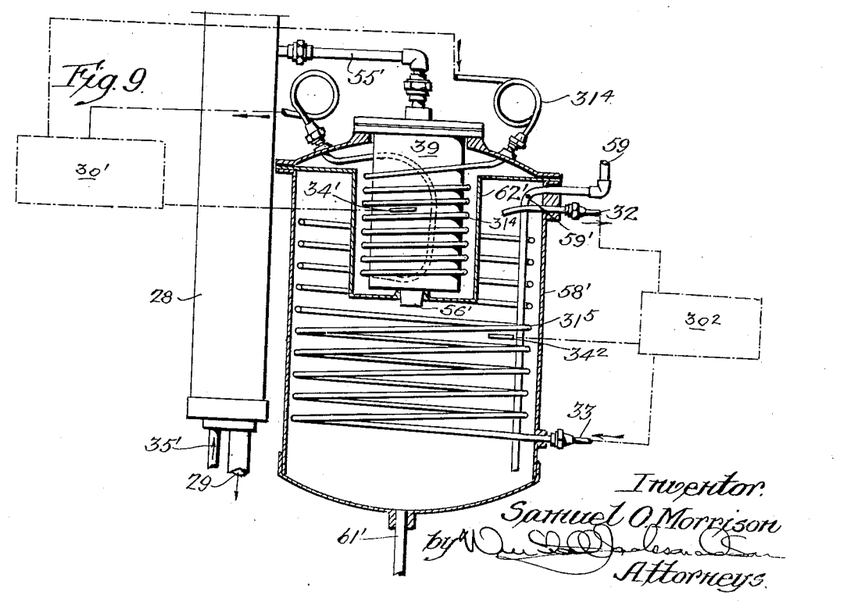
Figure 9 is a central vertical section of a still further modification of the invention.

In some cases it may be preferable to use separate refrigerant systems for supplying the automatic refrigeration to the water filter and to the heat transfer mechanism. Thus in Figure 9, the automatic refrigerator 30' is refrigerating the coil $31^4$ in heat transfer relation with the water filter 39, and the system is under the control of the thermostatic element 34' in contact with the water filter casing. A wholly separate automatic refrigerating mechanism $30^2$ supplies refrigerant through inlet 33 to refrigerant coil $31^5$ in the heat transfer reservoir 58' and receives return from outlet 32. Control is by wholly separate thermostatic element $34^2$ in the heat transfer reservoir. A partition 62' separates the filter space from the reservoir space, and by this construction heat loss through partition 62' is minimized. Except for the features noted, the form of Figure 9 may be identical with that of Figure 8.

Figure 10:
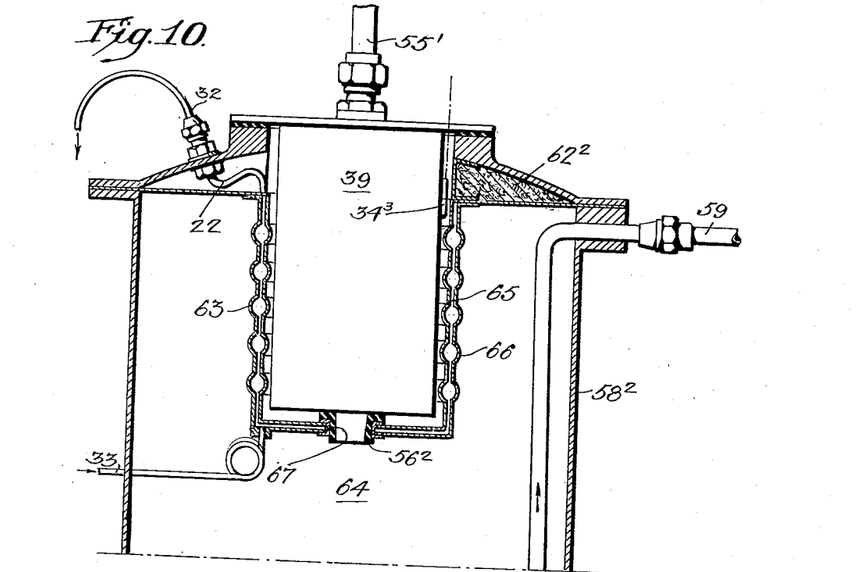
Figure 10 is a central vertical section of an additional modification.

In some cases it is preferred to use a hollow wall construction, with refrigerant in the hollow wall, as the heat transfer. In Figure 10, I illustrate a suitable heat transfer reservoir $58^2$ having a filter 39 inserted in its head $62^2$. A hollow wall heat transfer mechanism 63 is placed between the filter and the interior water space 64 of the heat transfer reservoir. Heat transfer takes place to the filter through the inner wall 65 of the double wall and to the heat transfer reservoir through the outer wall 66.

Refrigerant is introduced to the interior of the hollow wall through an inlet 33 and withdrawn through an outlet 32, the system being under control of a thermostatic element $34^3$ in contact with the water filter. Water enters desirably from a pre-cooler not shown, through the inlet connection 55' to the water filter, leaves the water filter through a desirably gasket fitting $56^2$ passing through a passage 67 in the hollow wall of the heat transfer mechanism and enters the chamber 64 of the heat transfer reservoir. Outlet to the bubbler is provided at 59.

In the cases of industrial establishments, office buildings and hotels, it may be desirable to refrigerate the water filter separate from the means for storing the water, and whether or not the water is kept cold after filtration.

Figure 11:
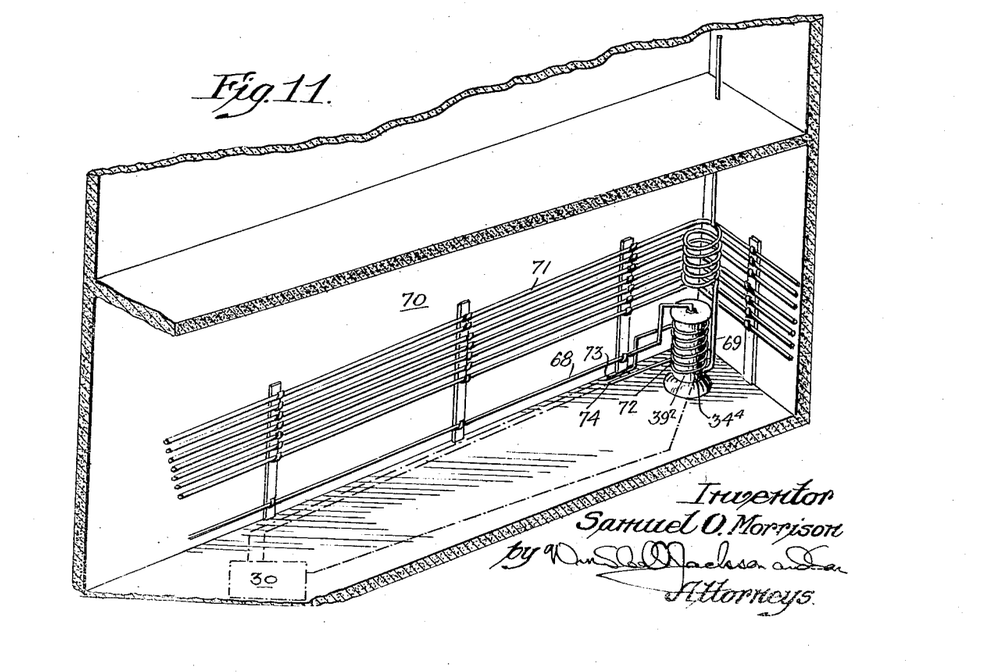
Figure 11 is a fragmentary perspective view of a further modification of the invention.

In Figure 11, I provide a suitable water filter $39^2$ having an inlet at 68 and outlet at 69. The water filter is desirably placed in a refrigerated room having insulated walls 70 and provided with refrigeration pipes 71. Surrounding the water filter and in heat transfer relationship with it, is a refrigerant coil 72 receiving refrigerant at 73 and returning it at 74 to an automatic refrigeration system under control of a suitable thermostat $34^4$.

It will be evident that the internal construction of the water filter is not important to the present invention, although it is preferred to use a replaceable cartridge filter of the type invented by Orville C. Morrison, above referred to, and illustrated more in detail in Figure 12 of his said application (omitting the refrigerant coils shown in the various figures). Here the filter casing 41 receives the removable cover 40 under the pressure of thumb screws 75 with gasketing at 76. Inlet to the water filter is provided at 77 and outlet at 78 with suitable drainage at 79. The casing is at 78 with suitable drainage at 79. The casing may desirably be mounted by lugs 80. The interior of the filter consists of an inlet chamber 81, a coarse filter medium 83, transfer chamber 84 and an outlet chamber 85, desirably formed by a tube 86 of porous carbon which seals by a suitable rubber gasket 87 to the outlet 78. The coarse filter, filter medium and outlet chamber are desirably all parts of a removable cartridge which is normally spring urged from the cover 40 down to seal at the gasket 87 by a spring 88, which is suitably united to the cartridge at 88' as by stitching, not shown, and which serves as a handle for removing and replacing the cartridge.

Figures 12, 12A:
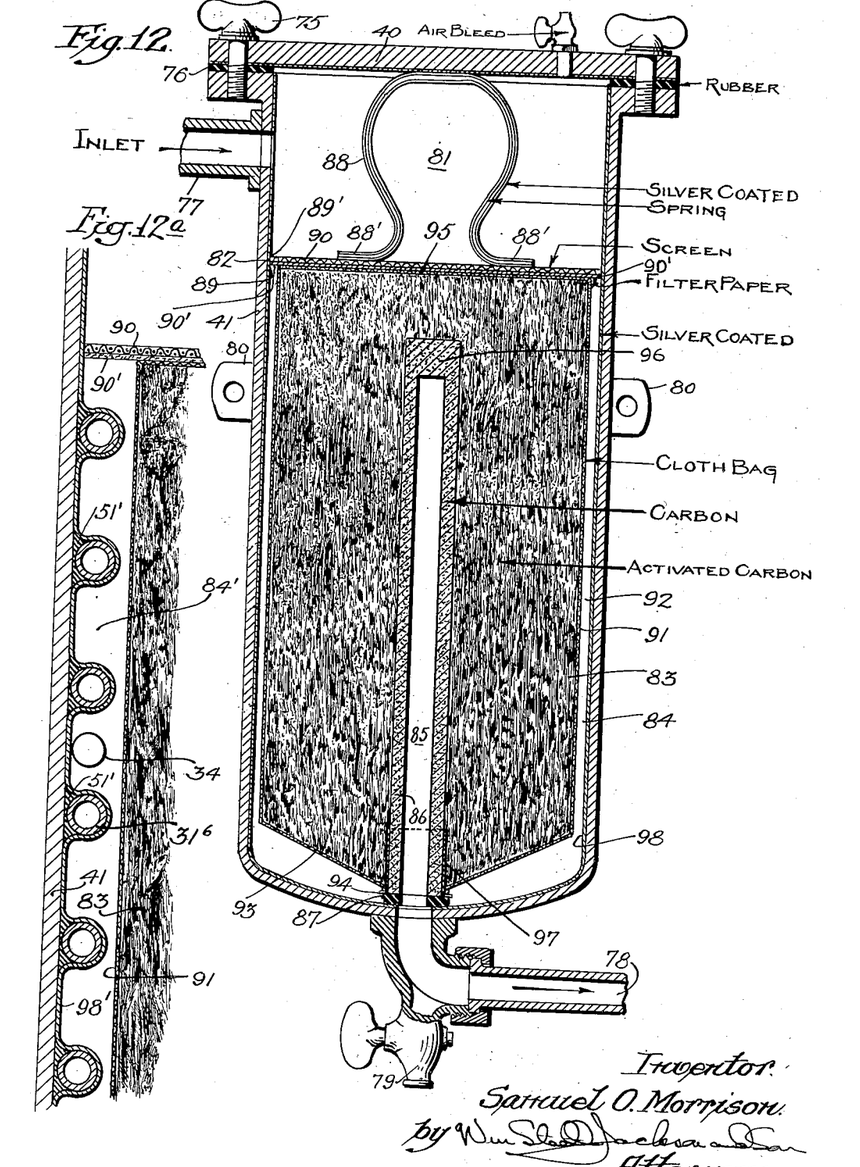
Figure 12 is a central vertical section of a desirable form of water filter interior, not in itself forming a part of the present invention.
Figure 12a is a fragmentary central vertical section of a modified filter construction.

The coarse filter 82 extends fully across the uniform interior bore 89 of the casing, snugly fitting the bore at 89', so that on withdrawal of the cartridge, all gross inclusions of foreign material will be forced upward and out of the filter and the edges of the inlet chamber will be well wiped by the coarse filter.

The coarse filter suitably comprises a screen 90, of metal or plastic, and filter paper 90', preferably united by stitching. The filter medium 83 is desirably activated carbon contained within a suitable fabric bag 91 which extends around the filter medium at 92 inside the casing to provide space for the transfer chamber 84, and beneath the filter medium spaced from the casing at 93, being suitably joined to the tube 86 forming the outlet passage as by cord 94. The bag also extends over the top of the filter medium at 95 and is suitably stitched or otherwise united to the coarse filter. Water from the inlet chamber 81 passes through the coarse filter which removes gross inclusions.

If it passes through at the center, it then directly enters the activated carbon or other filter medium, which removes taste, color, turbidity and odor, flowing down and then through the permeable walls of the outlet chamber 85. It will be noted that the end of the outlet chamber is closed at 96. Water passing through the edges of the coarse filter will enter the transfer chamber 84 and flow down through the transfer chamber to some point at which it flows through the filter bag into the activated carbon, through the activated carbon and through the porous walls of the outlet chamber to the outlet.

In order to prevent a short circuiting, the walls 86 are desirably coated for a short distance from the lower end at 97 by a waterproof material such as vinyl chloride-vinyl acetate copolymer.

In order to reduce further the possibility of electrolytic corrosion, it may be desirable to employ a noble metal such as gold, silver or platinum as a lining or cover on metal parts exposed at the interior of the filter. Though I do not regard this as essential in view of the marked reduction in electrolytic corrosion accomplished due to the refrigeration, it may in some cases be desirable to employ the noble metal on all interior metallic parts as a coating, cladding or other suitable layer. This may desirably be done at 98 on the interior wall of the casing, over the entire outside of the spring and in some cases on the screen of the coarse filter if a metallic screen be used.

While it is not regarded as essential in the present invention, it may be desirable to use silver or silver alloy as the noble metal because silver exhibits the property of inhibiting the growth of organisms in the filter when it is employed in the filter interior. Thus the controlled low temperature of the filter will minimize the growth of organisms and electrolytic corrosion, while the silver or silver alloy will likewise cooperate to reduce the growth of organisms and to prevent electrolytic corrosion.

In Figure 12a I show a variant type of filter construction having a refrigerant coil $31^6$, suitably of copper, brazed or otherwise bonded at 51' to the inside of the casing 41 of water filter 39. A layer of silver or other noble metal is applied over the inside of the metallic parts at 98'. The size of the transfer chamber 84' is enlarged by making the bag 91, containing the filter medium 83 smaller. Above the coarse filter 90, 90' the refrigerant coil does not extend, so that the cartridge can be changed as in Figure 12. Any other suitable internal refrigerant filter construction may be used if desired.

It will be evident that the continued maintenance of a filter temperature low enough so as to avoid growth of bacteria or a rate of growth which would prove objectionable is highly important and is largely independent of the position of the filter in or in connection with the refrigerating unit, being highly effective for the purpose intended whether the filter be within the main refrigerator or outside of it and whatever the means of refrigeration of the filter.

In view of my invention and disclosure variations and modifications to meet individual whim or particular need will doubtless become evident to others skilled in the art, to obtain all or part of the benefits of my invention without copying the structure and process shown, and I, therefore, claim all such insofar as they fall within the reasonable spirit and scope of my claims.

Having thus described my invention what I claim as new and desire to secure by Letters Patent is:

1. In a water cooler, a water filter, a heat transfer mechanism comprising a tube within a tube in heat transfer relationship with the water filter, means for passing water through the heat transfer mechanism and through the water filter and means for passing refrigerant through the heat transfer mechanism.

2. In a water cooler, a water filter of generally cylindrical contour, a heat transfer coil comprising a tube within a tube surrounding and in contact with the water filter, means for passing refrigerant through the inner tube and means for passing water through the space between the tubes and through the water filter.

3. In a water cooler, a pre-cooler in heat transfer relation with cooled waste water, a water filter, a heat transfer mechanism in heat transfer relation with the water filter, means for passing water first through the pre-cooler, next through the heat transfer mechanism and then through the water filter, and means for passing refrigerant through the heat transfer mechanism.

4. In a water cooler, a water filter, a heat transfer mechanism comprising a tube within a tube in coil form surrounding and in heat transfer relation with the water filter, the subsequent turns of the outer tube bonded to the water filter and the initial turns being unbonded, means for passing water through the heat transfer mechanism in the space between the inner tube and the outer tube and through the water filter, and means for passing refrigerant through the inner tube of the heat transfer mechanism.

5. In a water cooler, a water filter, a water coil surrounding the water filter and in heat transfer relation with it, means for passing water through the water coil and through the water filter, a refrigerant coil in heat transfer relation with the water filter and the water coil, and means for passing refrigerant through the refrigerant coil.

6. The process of operating a filter and reducing electrolytic corrosion therein, which comprises passing water to be filtered through a filter bed including activated carbon in the filter bed and a corrodible metal casing in contact with the water around the filter bed, and continuously maintaining the filter bed, including the activated carbon and the metal casing, under automatic refrigeration at a predetermined low temperature.

7. In a filter, a water filter having a corrodible metal casing, a filter bed in the casing in position to receive water to be filtered and including activated carbon in the filter bed, inlet and outlet connections for passing water to be filtered through the filter bed in contact with the corrodible metal casing and an automatic refrigeration system cooling the filter, including the corrodible casing and the activated carbon.

8. A water filter having a corrodible metal casing and having a filter cartridge in the casing containing activated carbon in the cartridge, inlet and outlet water connections to the casing adapted to pass water to be filtered through the filter cartridge in contact with the metallic casing on the interior, an automatic refrigeration unit including an evaporator in heat transfer relation with the casing of the filter, and control means for the automatic refrigeration unit responsive to the temperature maintained in the filter.

9. In a filter, a water filter having a corrodible metal casing, a filter bed in the casing in position to receive water to be filtered and including activated carbon in the filter bed, a tube-in-tube heat transfer mechanism surrounding the water filter and in heat transfer relation therewith, means for passing drinking water through the space between the inner tube and the outer tube and through the water filter, through the filter bed thereof in contact with the corrodible metal casing, means for passing a cooling refrigerant through the inner tube, the outer tube being in direct heat transfer relation with the water filter over a portion of its extent, and an extension on the inner tube in direct heat transfer relation with the water filter over another portion of its extent cooling the filter, including the corrodible casing and the activated carbon.

10. In a water cooler, a water filter having a corrodible metal casing, a filter bed in the casing in position to receive water to be filtered and including activated carbon in the filter bed, inlet and outlet connections for passing water to be filtered through the filter bed in contact with the corrodible metal casing, a heat transfer vessel, means for passing water through the heat transfer vessel in series with the water filter, automatic refrigeration means cooling the filter including the corrodible casing and the activated carbon, and automatic refrigeration means cooling the heat transfer vessel.

11. In a water cooler, a water filter having a corrodible metal casing, a filter bed in the casing in position to receive water to be filtered and including activated carbon in the filter bed, inlet and outlet connections for passing water to be filtered through the filter bed in contact with the corrodible metal casing, a heat transfer vessel surrounding the water filter, means for passing water through the heat transfer vessel in series with the water filter, automatic refrigerating means for cooling the vessel and automatic refrigerating means for cooling the filter, including the corrodible casing and the activated carbon.

12. In a water cooler, a hollow wall heat transfer mechanism, a water filter in heat transfer contact with the heat transfer mechanism on one side and having a corrodible metal casing, a filter bed in the casing in a position to receive water to be filtered and including activated carbon in the filter bed, inlet and outlet connections for passing water to be filtered through the filter bed in contact with the corrodible metal casing, walls forming a water chamber in heat transfer contact with the heat transfer mechanism on the other side, means for passing water through the chamber in series with the water filter and an automatic refrigeration system including means for passing cooling refrigerant through the hollow wall, cooling the water chamber and cooling the filter, including the corrodible casing and the activated carbon.

SAMUEL O. MORRISON.

REFERENCES CITED

The following references are of record in the file of this patent:

UNITED STATES PATENTS

| Number | Name | Date |
|---|---|---|
| 1,960,975 | Mulch | May 29, 1934 |
| 2,022,164 | Sweetland | Nov. 26, 1935 |
| 2,123,092 | Behrman | July 5, 1938 |
| 2,127,848 | Smith | Aug. 23, 1938 |
| 2,278,225 | Taylor | Mar. 31, 1942 |
| 2,450,095 | Seebold | Sept. 28, 1948 |